United States Patent
Le Therisien et al.

[15] 3,640,079
[45] Feb. 8, 1972

[54] METHOD AND APPARATUS FOR CONNECTING TWO SUBMERGED INHABITABLE ENCLOSURES

[72] Inventors: Louis G. Le Therisien; Henri A. Marion, both of Paris, France

[73] Assignee: Compagnie Francaise des Petroles, Societe Anonyme, Paris, France

[22] Filed: Feb. 16, 1970

[21] Appl. No.: 11,602

[30] Foreign Application Priority Data

Feb. 14, 1969 France ......................... 6903654

[52] U.S. Cl. ................................. 61/69, 285/97
[51] Int. Cl. ......................................... B63c 11/34
[58] Field of Search ............... 61/69 R, 69 A, 16; 114/16.7; 49/477; 285/97

[56] References Cited

UNITED STATES PATENTS

| 1,803,369 | 5/1931 | Teeple et al. ........................ 61/69 A |
| 1,838,566 | 12/1931 | Merritt ................................ 61/69 A |
| 1,912,271 | 5/1933 | Furino ................................. 61/69 A |

FOREIGN PATENTS OR APPLICATIONS

| 120,102 | 10/1918 | Great Britain ....................... 61/69 A |
| 574,209 | 4/1933 | Germany ............................... 49/477 |

*Primary Examiner*—J. Karl Bell
*Attorney*—Sughrue, Rothwell, Mion, Zinn & Macpeak

[57] ABSTRACT

A method and apparatus for connecting two submerged enclosures one fixed and one mobile wherein the mobile enclosure has a tubular passageway, the outside end of which has an inflatable joint and a lip joint for connecting in sealing engagement, the tubular passageway of the mobile enclosure with an opening in the fixed enclosure.

18 Claims, 3 Drawing Figures

INVENTORS
LOUIS G. Le THERISIEN
HENRI A. MARION

BY Sughrue, Rothwell, Mion, Zinn & Macpeak

ATTORNEYS

METHOD AND APPARATUS FOR CONNECTING TWO SUBMERGED INHABITABLE ENCLOSURES

BACKGROUND OF THE INVENTION

Field of the Invention

This invention relates to a method and apparatus for connecting two pressurized submerged, inhabitable enclosures, with one of the enclosures being mobile and the other one being fixed on the ocean bottom.

All known devices for connecting inhabitable enclosures under water require their own clean and united connecting surfaces, as well as a very precise centering of the application surface. Prior art devices are expensive, maintenance is difficult, and their method of connection is not at all practicable because of the maneuvering precision required.

SUMMARY OF THE INVENTION

The main object of this invention concerns a device for connecting a first enclosure to a second enclosure, both of which are under atmospheric pressure or at a pressure which is low with respect to the outside pressure. The device is characterized by the fact that the first enclosure has a tube secured to it, a portion of which protrudes beyond the enclosure toward the outside thereof. An autoclave panel is employed to close off the portion of the tube situated inside the enclosure. A joint is provided which borders the outside end of the tube. A rigid support bearing is also located on the outside circumference of the pipe and a joint in the form of a lip surrounds the outside end of the tube. The other edge of the support is on the level of the lower portion of the tube joint and means are provided for removing fluid contained in said tube. The second enclosure has a flat surface equipped with an opening which is closed off by an autoclave panel whose diameter is smaller than that of the tube of the first enclosure.

The first advantage of this device is that it facilitates the considerable shifting of the axis of the tube, which axis need not be situated along the axis of the access opening of the second enclosure. The approach maneuver thus does not have to be precise and it is no longer necessary to provide guide surfaces which were required in order that the connecting surface sections coincide with precision.

A second advantage is that the enclosure is made to rest on a rigid support, thus preventing crushing of the joint which lines the outside end of the tube.

In addition, the use of means for pumping the fluid contained in the tube enables one to establish depressurization with respect to the outside environment, which results in a first tight sealing zone between the lip bordering on the rigid support and the flat surface of the second enclosure.

Another object of the invention is to increase the sealing of the above mentioned device by using, as a support for the lip-equipped joint, a continuous knife edge surrounding the extremity of the tube, the end of said edge being on the level of the extremity of the joint of said tube.

Thus, the application of the knife edge upon the flat surface of the second enclosure, especially during the creation of a depressurization inside the tube, facilitates the destruction of any possible concretions of animal origin which might have formed on this surface.

Furthermore, the knife edge itself forms a joint and its action, combined with that of the lip joint, helps guarantee the tightness of the seal of the tube joint, even in cases where there is an irregularity on the flat surface of the second enclosure.

Another object of this invention is to strengthen the tightness of the seal of such a device at any depth by using, as a sealing joint at the outside end of the tube, an inflatable elastic joint. Means are provided inside the first enclosure for inflating the elastic joint at the desired pressure. Thus, one can compensate for the strong pressure following the depression created in the pipe.

Another object of this invention is to remedy even further the effects of the very strong pressure encountered under water at a certain depth resulting from depressurization in the tube, by equipping the tube with a crown of jacks the end rods of which may be brought to the level of the outside end of the tube. The jacks can be controlled from the inside of the enclosure.

It thus becomes possible, regardless of the depth at which the linkup is performed, to apply the inflatable joint against the flat surface of the second enclosure without doing damage to it. The end of the rods of the jacks are then supported on the surface of the second enclosure and they exert a given pressure that prevents any crushing of the inflatable joint.

Another object of the invention is to increase even further the tightness of the seal of the device by creating, outside the tube bearing the inflatable joint and during the application of the outside end of the mobile tube upon the flat surface of the fixed enclosure, a ring-shaped sealed chamber. The sealed chamber reveals, from its outside toward its inside, a joint in the form of a lip shouldered by a knife edge and constituting a lateral outside wall of the chamber. A crown supporting the knife edge is connected by a first set of jacks to the first enclosure. A toric channel is provided by an elastic membrane bordered by two vertical guided skirts and a crown attached to the tube, the crown supports a set of supporting jacks surrounding the tube. Pumping means are also provided in the enclosure to evacuate the fluid contained in the ring-shaped chamber which is bordered below by the surface of the second enclosure, bordered laterally by the knife edge that bears the lip joint and by the tube, and bordered on top by the jack-carrying crown, the elastic membrane, and the knife-edge-carrying crown.

In this way an easy means is provided for establishing a tightly sealed chamber all around the inflatable joint, which is bordered laterally by the elastic membrane which lies flat upon the level surface of the second enclosure. This chamber thus stays tight during the pumping of the fluid that is between the knife edges and the inflatable joint. The application of the elastic membrane to the flat surface isolates the inflatable joint and the lip joint, thus creating three areas of sealing tightness: the tube bordered by its own joint, the zone between the pipe and the elastic membrane resting flat upon the surface of the second enclosure, and the zone between the elastic membrane and the lip joint.

Another object of the invention is the method for connecting two enclosures by means of the above-mentioned device. The method consists of the following steps: (a) placing the end of the tube of the mobile enclosure above the access opening of the second enclosure; (b) making the mobile enclosure heavy so as to apply it on a flat surface surrounding the access to the fixed enclosure, the application being performed by means of the end of a knife edge bordered by a lip joint wherein the pressure of the knife edge destroys any possible concretions which might exist on the surface of the fixed enclosure perpendicularly with respect to the knife edge; and (c) pumping the fluid that is inside the tube so as to create a depressurization thus applying the lip joint against the flat surface.

The placement of the mobile enclosure above the opening of the second enclosure does not have to be precise because the axis of the pipe may be outside the axis of the access opening of the second enclosure. Furthermore, it suffices merely to make the mobile enclosure heavy so as to obtain a zone of first sealing tightness, then to pump the fluid out which is located in the tube so as to strengthen the pressure exerted by the enclosure upon the knife edge and simultaneously increasing the tightness of the device by means of the application of the lip joint.

Another object of the invention is to make it possible to use this method at any depth after making the enclosure heavy and following these steps: (a) depressurizing tube; (b) inflating the tightness joint situated at the end of the tube; and (c) increasing the pressure of the rods of the supporting jacks upon the surface surrounding the access of the fixed enclosure.

The great flexibility offered by this method thus enables us to perform a linkup at any depth because it is possible at any time to control the support pressures upon the jacks and upon the elastic joint.

Another object of the invention is to facilitate the implementation of this method by increasing the tightness of the seal of the connecting device by creating a depression in a tightness chamber surrounding the connecting tube and then proceeding as before immediately after making the enclosure heavy for the purpose of keeping the tube in place around the access opening of the second enclosure.

The invention may be applied to all underwater projects requiring the transfer of personnel who must work in an enclosure situated on the ocean bottom at a great depth and under atmospheric pressure.

Other objectives and features of the invention will emerge from the following specifications prepared with reference to the attached drawings which, by way of example, illustrate one way of implementing the connecting device as well as one of its variants.

DETAILED DESCRIPTION OF THE INVENTION

Figure 1:
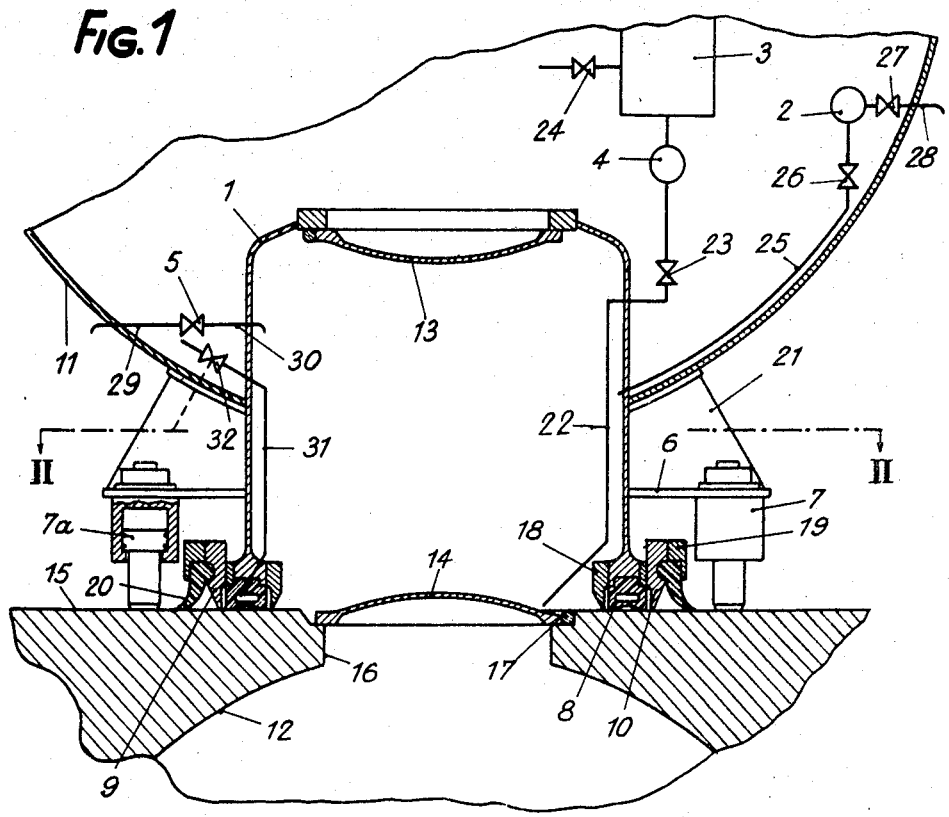
FIG. 1 is a schematic cross section view, along a plane passing through the axes of the two enclosures of the present invention which are presumed to be aligned.

Referring to FIG. 1, the enclosures 11 and 12 are shown already in the connected position. To make the drawing clearer, it will be assumed that the axis of the autoclave panels 13 and 14 of the two enclosures were aligned. This condition, however, is not required to perform the linkup as will be described in the following description.

Enclosure 11 may have any desired shape and is only partially shown here. Likewise, enclosure 12 is illustrated with the lower portion cut away. To facilitate the description to follow, it is assumed that enclosure 11 is mobile and belongs, for example, to a submarine, whereas, enclosure 12 is fixed on the ocean bottom.

The access threshold of the fixed enclosure 12 has a flat section 15 surrounding panel 14. The flat section 15 may consist of concrete and may surround the opening 16, in FIGS. 1 and 2. The hinge 17 of autoclave panel 14 opens toward the tube 1 and can be made of any suitable material.

Tube 1 of the mobile enclosure 11 is embedded in the wall of the enclosure 11 and has an outside portion containing a housing to form an inflatable tight joint 8. The housing is bordered on the inside by a crown 18 forming a knife edge at its lower portion and by a knife edge 10 on the outside thereof. A support 19 holds a lip joint 20 which is supported on knife edge 10, the latter in turn being supported on edge 9.

A crown 6, welded to the pipe 1 and to the buttresses 21, supports a series of supporting jacks 7.

Tube 1 has a certain number of openings through which pass ducts in order to create a pressure or depressurization in the tube 1 and in the inflatable joint 8. Duct 22 is connected to a tank 3 by means of pump 4 and valve 23. Valve 24 enables tank 3 to be placed at atmospheric pressure.

A second pumping circuit including duct 25, valve 26, pump 2, and valve 27, exit to the outside of enclosure 11 through duct 28, to enable a portion of the water contained in the tube to be expelled outside the tube 1.

Another circuit, consisting of valve 5 and ducts 29 and 30, makes it possible to establish direct communication between tube 1 and the outside environment.

A further circuit consisting of a duct 31 connects the inside of the inflatable crown 8 to a pump (not shown) via a valve 32 which is controlled by outside pressure.

When it is desired to move from enclosure 11 which may be a submarine, for example, to enclosure 12, the submarine is positioned perpendicular to panel 14. The submarine can be equipped with retractable runners on which the submarine can rest and which will keep the submarine in a certain spot.

When tube 1 is being used as a passage chamber and the central axis is in the vicinity of the axis of panel 14 without having to line up this axis and that of the tube, the runners of the submarine (not shown here) are retracted so that the knife edge 10 comes to rest upon the surface 15 around the panel 14. In the linkup takes place at a depth of 100 meters, tube 1 is placed at a low pressure of 2 bars, for example, with respect to the outside environment, by using a small centrifugal pump 2. By virtue of the depth at which we operate and by virtue of the density of the water, a force of about 26 tons can be achieved.

This increase in the force of the tube upon the access threshold 15 of the fixed enclosure results in an application of a pressure of about 325 kg./cm.$^2$ to the portion of surface 15 which is in contact with the knife edge 10 whose edge can have a thickness on the order of 1 mm. Because of this pressure and knife edge 10, the destruction of concretions which may have been deposited in this area is possible as is the creation of a relative tight seal.

Furthermore, lip joint 20 receives a pressure on the order of 22 kg. per centimeter of length which is applied to the threshold of the fixed enclosure in case a loss of tightness results on the part of the knife edge joint.

It is obvious that, if the seal is defective, all that need be done is to maintain the depression created in the tube by means of the small centrifugal pump 2.

We then apply, in chamber 7a of each support jack 7, a pressure of 10 bars which corresponds to the ambient pressure by means not shown here. The pressure is supplied to said chambers in a parallel fashion. The ratio of the diameters of the rods and the pistons results in a movement of the rods which are supported on surface 15 with a total force of 5.5 tons. Thus, effective support can be achieved even in cases where there are irregularities on surface 15.

The supply circuit of the jacks is then closed and the joint 8 is inflated by means of circuit 31 connected to control valve 32 and to a pump (not shown) so as to create a slight overpressure in joint 8 with respect to the ambient pressure.

After closing the inflating circuit 31, the tube 1 is emptied at atmospheric pressure by siphoning the water into tank 3 of enclosure 1 and pump 2 is then turned off.

The mobile enclosure 11 and its tube 1 thus apply, on surface 15, a force of about 133 tons due to the bottom effect. If the pressure is progressively increased while the tube is being emptied, to a pressure of approximately 89 bars in the chambers of jacks 7, the total effect of the pressure at the bottom of the sea will be absorbed by these support jacks.

It is noted that, even when the seal is lost in the inflatable joint, the knife edge joints 10 and the lip joint 20 guarantee safe operation by stopping the penetration of water, without, however, applying any excessive pressure of the knife edges 10 upon the surface 15. The thickness of the edges of the knife edges 10 are calculated to prevent any deterioration of the surface 15.

Operating personnel may then pass through the tube 1 by opening the panels 13 and 14, whose weight can be balanced by any known mechanism. The panels are opened toward the inside of the tube.

One of the principal advantages of this method of linkup is that it permits a rapid separation of enclosures. To separate the enclosures all that need be done is to: reclose the autoclave panels 13 and 14, resiphon the water at atmospheric pressure from tank 3 to the inside of tube 1, establish communication, by means of valve 5, between the ambient environment and the inside of the tube, and return the inflatable joint 8 to ambient pressure by means of circuit 31.

The bottom effect, that is to say, the force resulting from ambient pressure, is thus immediately suppressed and the mobile enclosure is released. The supporting jacks 7 can be locked and the pistons can be returned at a later time.

It is also noted that, in addition to the previously mentioned advantages such as the tolerance of alignment during placement of mobile enclosure, the triple tightness and eventual destruction of formations of animal origin, the unimportance of irregularities of the support surfaces, a further advantage results because the crown 18, which shoulders the inflatable joint 8, likewise participates in the destruction of concretions and prevents the protrusion of the inflatable joint 8. The shape of the joint 8 and its housing facilitates its replacement and prevents in from being crushed during the application of the tube to the threshold 15. The noninflated joint is slightly recessed with respect to the threads of knife edges 10 and 18.

Contrary to other devices, no mechanical locking of the mobile enclosure 11 upon the fixed enclosure 12 is necessary by virtue of the large application force resulting from ambient pressure.

As regards the siphoning of the water from the tube 1 into the enclosure or from the enclosure into the tube, this operation can be performed with a small expenditure of power because the pressure is first of all reduced with the help of pump 2 and because the siphoning takes place place at atmospheric pressure. These advantages result regardless of the depth at which the linkup is performed.

At shallow depths, the jacks 7 can be eliminated and inflatable joint 8 may be replaced by a joint having a certain thickness and resting on the access threshold 16 of the fixed enclosure 12 before the knife edges 10, 18 of the housing come to rest upon the threshold.

Figure 2:
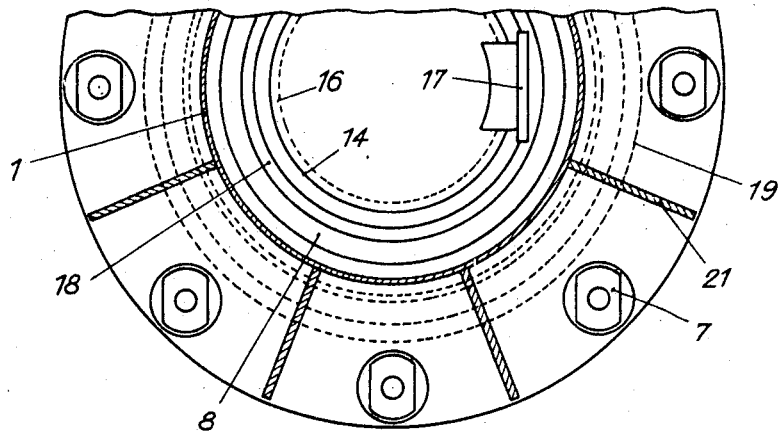
FIG. 2 is a plan view of a partial cross section view taken along lines II—II of FIG. 1.
Figure 3:
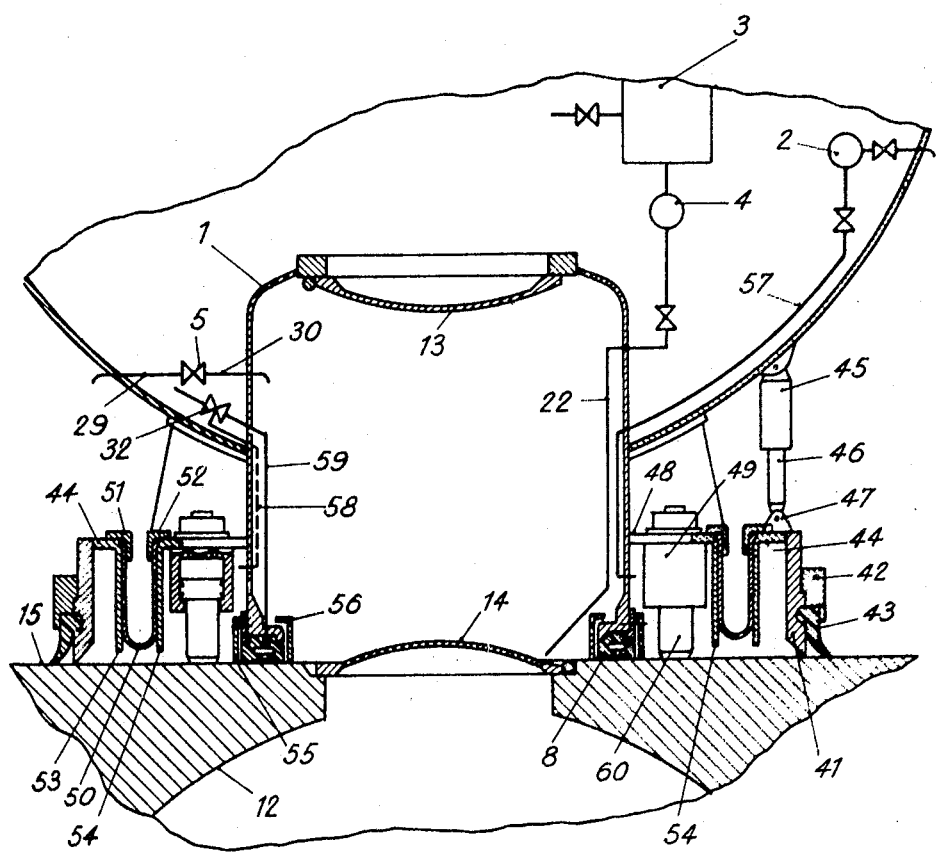
FIG. 3 is a schematic view of an axial cross section view of one variant of the enclosure connecting device of FIG. 1.

FIG. 3 discloses one way of implementing a variation of the connecting device shown in FIGS. 1 and 2.

In order to facilitate the understanding of this figure, portions identical to those shown in FIGS. 1 and 2 have been designated with the same numerical reference, similar but not identical portions bear reference numbers above 40.

In the embodiment of FIG. 3, the assembly of the knife edge 41 and of the support 42 of the lip 43, which constitute the joint, is borne by a crown 44 which is suspended from three jacks 45, at whose ends rods 46 are connected by attachments 47 to crown 44.

Crown 48 of supporting jacks 49 is attached to tube 1 and serves as a fixed support for one of the edges of a rubber membrane 50 having a U-shaped cross section. The other edge of the membrane 50 is supported by crown 44 of the knife-edge-supporting assembly 41. The edges of the membrane 50 are held against their crown supports 44, 48 by means of angle irons 51 and 52. Membrane 50 is guided laterally by vertical skirts 53 and 54 of crowns 44 and 48.

Inflatable joint 8 is held laterally by two vertical crowns 55 and 56, intended to prevent the expansion of the joint 8.

In order to connect the enclosures 11, 15, the first enclosure is moved to a point perpendicular with respect to the access of the second enclosure and the submarine, which is resting on its runners, is made in the first manner of implementation, heavier. In this stage, the rods 46 of jacks 45 supporting crown 44 are withdrawn so that the assembly of knife edge 41 is in the raised position.

Referring back to the preceding example where the linkup takes place at a depth of 100 meters, a pressure of 5 bars is applied in the principal chambers of the jacks 45, thus producing a pressure sufficient to permit the descent of the crown 44 by its own weight. The force of application of knife edge 41 upon surface 15 then corresponds to a pressure of about 16 kg./cm.$^2$ when the thickness of the edge of the knife edge is 2 mm. This pressure makes it possible to destroy any existing concretions carried by surface 15 and to thus ensure tightness of the seal of the linkup.

The submarine then recovers its runners and the ring-shaped chamber, formed by surface 15, knife edge 41, crown 44, membrane 50, crown 48, and tube 1, is put in a slight depressurization with respect to the ambient environment. In order to do this, the pump 2 with duct 57 leading into the chamber is activated. The lip joint 43 undergoes a force of 5.5 kg. per centimeter of length in case of loss of tightness of knife edge 41 and this is applied upon surface 1, thus creating a primary seal.

In the event of a break in the seal the depressurization is maintained by means of the small centrifugal pump 2. If the depressurization prevails in the chamber, the knife edge joint 41 is applied to the surface 15 with a pressure of about 250 kg./cm.$^2$ for a knife edge base with a thickness of 2 mm., which will destroy any possible remaining concretions.

The force of 18 tons, resulting from the depressurization applied to the tube-and-jack-crown assembly, is absorbed by inflatable joint 8 which is subjected to a pressure of 10 bars by control valve 32 which control valve 32 communicates via duct 58 with the chamber in which is depressurized and via duct 59 with joint 8. The inflating circuit is then closed.

Rods 60 of support jacks 49, whose inside chamber pressure is equal to ambient pressure and whose pistons are free due to the effect of the depressurization, descend until they are in contact with surface 15. The jacks are locked in this position by closing their control circuit which can be any kind (not shown). A definite support is thus accomplished by the eight jacks.

Tube 1 is then emptied by circuit 22 into tank 3 at atmospheric pressure, as before. The force exerted by the bottom effect upon the mobile enclosure 11 and its tube 1 increases to about 130 tons. This force is compensated by an increase in the pressure inside the supporting jacks up to a pressure on the order of 80 bars. The depressurization of 0.5 bar which is maintained in the ring-shaped chamber, is eliminated. The knife edge 41 and the lip joint 43 then guarantee safety in the event sealing tightness is lost on the part of the inflatable joint.

The rapid separation of enclosures is achieved in a manner identical to the process described previously without the use of any mechanical locking device.

Although only one variant of the connecting device that is the object of this invention has been described, in the case of a mobile enclosure being connected to a fixed enclosure whose access panel axis is vertical, it is obvious that the device as well as the method can be applied to the situation of a linkup between a mobile enclosure and a fixed enclosure whose access panel axes are horizontal or in any position.

In the case of an access panel having a horizontal axis, the ring-shaped chamber is lightened and may, for example, by sustained by two slideways. The jacks supporting the chamber compensate, through their thrust, for the loss of weight of the chamber. The submarine may have runners which unfold thus facilitating the positioning of the tube upon the flat and vertical surface of the fixed enclosure around the access opening. The runners of the submarine thus rest on the horizontal ocean bottom.

Although we have described only one mode of implementation and only one of its variants, it is obvious that one would not go beyond the framework of this invention if one were to modify the form of the elements described or if one were to replace them with equivalent means.

What is claimed is:

1. Connecting device for connecting in sealing engagement a mobile enclosure at atmospheric pressure and a fixed enclosure on the ocean bottom, comprising: a mobile enclosure having a passage tube protruding beyond said enclosure, an autoclave panel closing off the portion of the tube situated on the inside of the enclosure, an inflatable joint bordering on the end of the tube outside the enclosure, a rigid support bearing along its outside circumference and at one of its edges a joint in the form of a lip surrounding the outside extremity of the tube, the other edge of the support being on the level of the lower portion of the inflatable joint, and means for pumping of the outside liquid contained in said tube, said second enclosure revealing a flat surface equipped with an opening that is closed off by an autoclave panel whose diameter is smaller than that of the tube of the first enclosure.

2. Connecting device as set forth in claim 1, further comprising a rigid support for the lip joint and a continuous knife edge surrounding the extremity of the tube of the enclosure whose bottom edge is on the level of the extremity of the joint of said tube to thereby increase the seal between said mobile enclosure and said fixed enclosure.

3. Connecting device as set forth in claim 1 further comprising: an elastic inflatable joint at the exterior extremity of the tube as a sealing joint and means being provided inside the first enclosure in order to inflate said joint to the desired pressure to thereby increase the seal for any depth.

4. Connecting device as set forth in claim 1 further comprising: an elastic inflatable joint at the exterior extremity of the tube, and an inflating circuit for said joint consisting of a control valve governed by the pressure prevailing in the ambient environment surrounding said joint to thereby increase the seal for any depth.

5. Connecting device as set forth in claim 1 further comprising a circuit connecting the interior of the tube to the exterior of said enclosure said circuit being controlled by a valve located in said mobile enclosure.

6. Connecting device as set forth in claim 1, wherein the fluid-pumping means in the mobile enclosure comprises a pump connected to a tank, said tank having a valve so that it can be placed under atmospheric pressure. enclosure, 7. Connecting device as set forth in claim 1 further comprising: a pumping circuit connecting the inside of the tube to the outside of the mobile enclosure, said circuit having a duct extending into the tube, a first valve in said duct, a low-power centrifugal pump connected to said valve, and a duct for the evacuation of fluid to the outside of the enclosure said duct being connected to said pump and having a second valve therein.

8. Connecting device as set forth in claim 1 further comprising: a crown of jacks having rods for engaging the surface of the threshold of the fixed enclosure, said jacks being controlled from the inside of the enclosure.

9. Connecting device as set forth in claim 1 further comprising a ring-shaped sealing chamber positioned outside of the tube for increasing the seal between the outside end of the mobile tube and the flat surface of the fixed enclosure, said chamber having a joint in the form of a lip shouldered by a knife edge and constituting a lateral outside wall of said chamber, a crown supporting said knife edge connected by a first set of jacks to the first enclosure, a toric channel consisting of an elastic membrane bordered by two vertical guide skirts and a crown fixed to said tube, said crown supporting a set of supporting jacks surrounding the tube, pumping means provided in the enclosure in order to evacuate the fluid contained in said ring-shaped chamber bordered below by the surface of the second enclosure, bordered laterally by the knife edge carrying the lip joint and by the tube, and bordered on top by the jack-carrying crown, the elastic membrane, and the knife-edge-carrying crown.

10. Connecting device as set forth in claim 9 further comprising: a pumping circuit connecting said ring-shaped chamber to the outside of said movable enclosure, said circuit having a duct extending from the vicinity of the inflatable joint, said duct being connected by a valve to a low-power centrifugal pump whose output is connected to the outside of said movable enclosure by means of a second valve.

11. Connecting device as set forth in claim 1 wherein, the access openings of the mobile enclosure and of the fixed enclosure have autoclave panels that open toward the inside of said tube.

12. Connecting device as set forth in claim 11 wherein said tube has a series of support jacks which are emptied by establishing a low pressure in said tube with respect to the ambient environment, and depressurizing the chambers of the support jacks.

13. A method for connecting a mobile enclosure, at atmospheric pressure, to a fixed enclosure on the ocean bottom comprising the steps of:
 a. equipping the mobile enclosure with a passage tube having a closed end extending into said mobile enclosure and an open end extending outside of said mobile enclosure, said open end having a border containing sealing devices and fixed supporting devices and adjustable supporting devices;
 b. surrounding the closed access opening of the fixed enclosure with a flat surface;
 c. moving said tube end above the access opening of the fixed enclosure;
 d. making said mobile enclosure heavy so as to put its supporting devices and said sealing devices into contact with said flat surface;
 e. emptying the tube so as to create a depressurization with respect to the ambient pressure; and
 f. perfecting the sealing of the two enclosures by means of the force resulting from the ambient pressure while adjusting the adjustable supporting devices to reduce the large force applied to the sealing devices resulting from the ambient pressure.

14. Method as set forth in claim 13 wherein said tube is emptied by siphoning the water contained in the tube into a tank of the mobile enclosure at atmospheric pressure.

15. Method as set forth in claim 13 wherein said supporting and sealing devices form a ring-shaped tightness chamber and wherein said tube emptying operation being preceded by an operation creating a slight depressurization in said ring-shaped chamber.

16. Method as set forth in claim 13 wherein one of said tightness devices is inflatable, and wherein said tube emptying operation is preceded by the inflation of said tightness device.

17. Method as set forth in claim 13 wherein said support devices involve jacks, and wherein said tube emptying operation is completed by the placement of the chambers of said supporting jacks under pressure.

18. Method as set forth in claim 13 wherein the separation of the mobile enclosure from the fixed enclosure is accomplished, after closing the access openings of said enclosures by the steps of: (a) returning the water into the tube which was siphoned into the tank of the mobile enclosure; (b) placing the tube under ambient pressure through the establishment of communication between the tube and the outside; and (c) deflating the inflatable tightness joint.

* * * * *